April 23, 1957 — R. L. KYHL — 2,790,143
MAGIC TEE BRIDGE
Filed May 8, 1946 — 2 Sheets-Sheet 1

INVENTOR
ROBERT L. KYHL

BY *M. A. Hayes*
ATTORNEY

INVENTOR
ROBERT L. KYHL

United States Patent Office 2,790,143
Patented Apr. 23, 1957

2,790,143

MAGIC TEE BRIDGE

Robert L. Kyhl, Cambridge, Mass., assignor, by mesne assignments, to the United States of America as represented by the Secretary of the Navy Application May 8, 1946, Serial No. 668,033

8 Claims. (Cl. 324—58)

This invention relates to measuring apparatus and more particularly to such apparatus for measuring complex impedances at microwave frequencies.

Heretofore the slotted line method has commonly been used for complex impedance measurements at microwave frequencies. The procedure is to terminate a slotted section of transmission line or wave guide in the unknown impedance and then to determine the position of the voltage minimum and the voltage standing wave ratio by means of a traveling detector and probe extending through the slot. Information obtained in this manner is sufficient for calculation of the unknown impedance. This method is accurate but cumbersome and time consuming.

There are many instances in which the unknown impedance changes with time. In these cases it is desirable to have an instantaneous indication of the unknown impedance. In other instances the equivalent of a "go-no go" gage is needed for production testing. Here a rough but rapid measurement is desirable.

Therefore it is an object of this invention to provide apparatus for measuring complex impedances at microwave frequencies.

It is another object of this invention to provide such apparatus which will make instantaneous measurements.

It is a further object of this invention to provide such apparatus which will represent the unknown impedance as a point on an impedance chart of the Smith type on the face of a cathode ray tube.

These and other objects will become apparent upon consideration of the following description in conjunction with the accompanying drawings in which.

Figure 1:
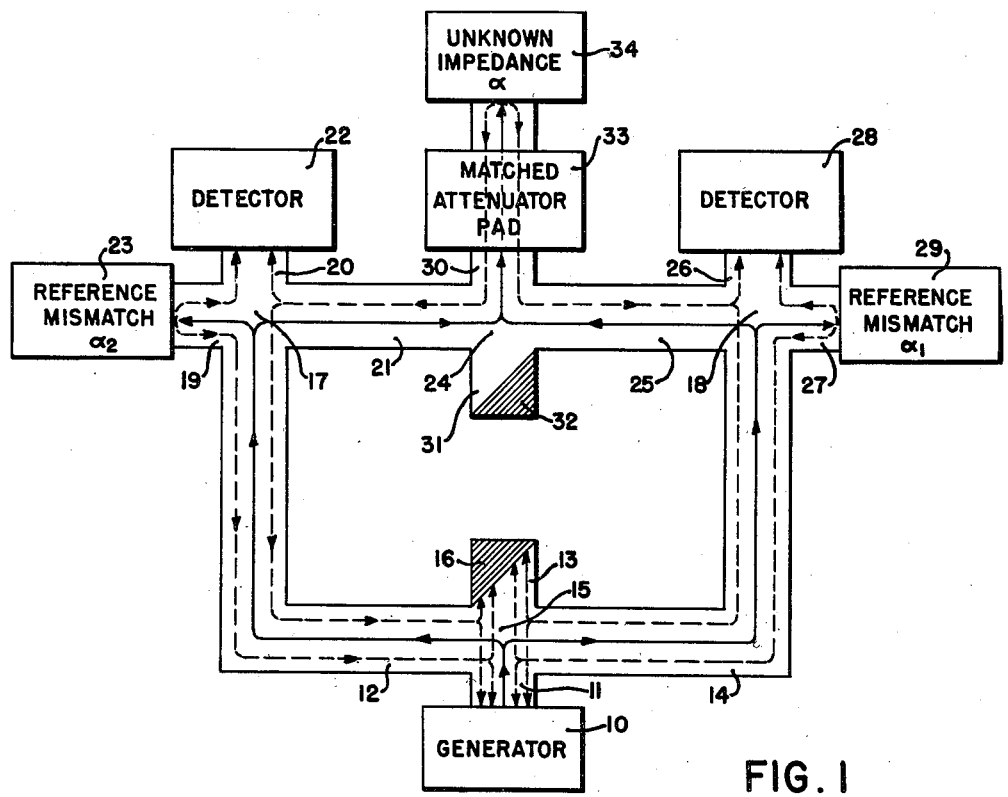
Fig. 1 is a block diagram of one embodiment of a first species of the invention.

Fig. 1 discloses generator 10 matched to and injecting power into wave guide section 11 which, in turn is terminated in the junction of wave guide sections 12, 13, and 14. This wave guide junction hereinafter referred to as magic tee 15 will be discussed in detail below. Wave guide section 13 located opposite wave guide section 11 is terminated in matched load 16. Wave guide sections 12 and 14 located opposite to one another and adjacent to wave guide section 11 are terminated in magic tees 17 and 18 respectively. Magic tee 17 comprises the junction of wave guide sections 12, 19, 20, and 21. Detector 22 provides a matched termination for wave guide section 20 located opopsite wave guide section 12. Reference mismatch 23 having a voltage reflection coefficient $\alpha_2$ terminates wave guide section 19 located adjacent to wave guide section 12. Wave guide section 21 located opposite wave guide section 19 is terminated in magic tee 24. Magic tee 18 comprises the junction of wave guide sections 14, 25, 26, and 27. Detector 28 provides a matched termination for wave guidse section 26 located opposite wave guide section 14. Reference mismatch 29 having a voltage reflection coefficient $\alpha_1$ terminates wave guide section 27 located adjacent to wave guide section 14. Wave guide section 25 located opposite wave guide section 27 is terminated in magic tee 24. Magic tee 24 comprises the junction of wave guide section 21, 30, 25, and 31. Wave guide sections 21 and 25 enter the junction of magic tee 24 from opposite directions as do wave guide sections 30 and 31. Wave guide section 31 is terminated in matched load 32. Matched attenuator pad 33 is inserted in wave guide section 30 and presents an impedance match from either direction therein. Matched attenuator pad 33 may have the form of a transmission line section having a characteristic impedance equal to the characteristic impedance of wave guide section 30 but having a relatively high attenuation per unit length. The attenuation of a wave guide section may be increased by filling the wave guide with a lossy dielectric or by inserting a power absorbing strip of graphite and a binder in the wave guide. The unknown impedance 34 having a reflection coefficient of $\alpha$ terminates wave guide section 30.

Figure 2:
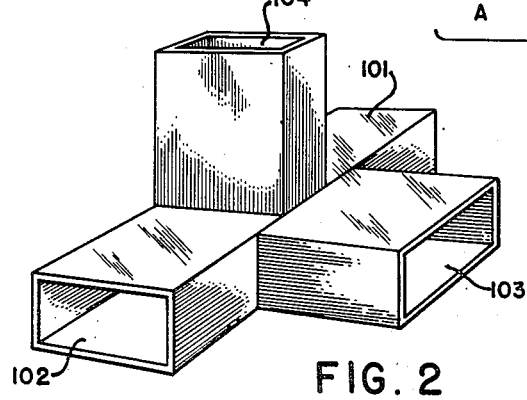
Fig. 2 is a perspective view of a magic tee of a type which could be used in the embodiment of Fig. 1.

Fig. 2 discloses a magic tee typical of those used in the embodiment of Fig. 1. Basically the magic tee operation depends upon the difference between the coupling of wave guide tees in the electric field or E plane and the magnetic field or H plane.

Arms 101, 102, and 104 constitute an E plane tee. If power is injected in arm 104, the coupling between this arm and the end arms 101 and 102 depends upon the fringing of the electric field at the junction. Thus equal waves will travel out each of the two end arms 101 and 102 but they will be of exactly opposite phase at points equidistant from the plane of symmetry. Thus the wave excited in the wave guide comprising end arms 101 and 102 may be said to have odd symmetry about the center plane. A wave will also be reflected back into arm 104.

Arms 101, 102, and 103 constitute an H plane tee. If power is injected in arm 103, the coupling between this arm and the end arms 101 and 102 is such that equal waves will travel out of each of the two end arms and they will be exactly in phase at points equidistant from the plane of symmetry. Thus in this case, the wave excited in the wave guide comprising end arms 101 and 102 may be said to have even symmetry about the center plane. Here, too, a wave will be reflected back into arm 103.

The magic tee may be seen to comprise one of each of these kinds of tees. Thus a wave injected into the E plane arm 104 will be transmitted only in the end arms 101 and 102 and not in the H plane arm 103 since the E plane tee excites only waves of odd symmetry about the center plane whereas it takes waves of even symmetry to excite the H plane arm 103. Similarly the H plane arm 103 will not couple power directly into the E plane arm 104. Matching devices are added to the magic tee to prevent reflections. The only restriction on these devices is in that they must not upset the symmetry of the waves at the junction. If the end arms 101 and 102 are terminated in matched loads and power is injected into the E plane arm 104, a mismatch will be found which may be cancelled out by the addition of a suitable iris or other matching device. Similarly, a match may be provided for power injected into the H plane arm 103.

To investigate the properties of the magic tee end arms 101 and 102 are terminated in matched loads and power is injected into H plane arm 103. Waves of equal amplitude and identical phase are formed in end arms 101 and 102 at points equidistant from the center plane. No power is reflected into H plane arm 103 and none is transmitted into E plane arm 104. Power injected into E plane arm 104 produces waves of equal amplitude but opposite phase in end arms 101 and 102 at points equidistant from the center plane and no power is reflected in E plane arm 104 and none transmitted in H plane arm 103. Power may then be injected into E plane arm 104 and H plane arm 103 simultaneously. For a particular relative phase and equal amplitudes the waves produced in end arm 102 will exactly cancel while those produced in end arm 101 will exactly add. Thus there is complete power transfer under this condition from E plane arm 104 and H plane arm 103 into end arm 101 with no power reflected. Now a reversal of the direction of the waves shows that power may be injected into end arm 101 and it will produce waves of equal amplitude in E plane arm 104 and H plane arm 103 with no power in end arm 102 and no reflection if matched terminations are provided. A similar condition can be shown to exist for power injected into end arm 102.

In summary, then, the magic tee has the property of transmitting power from any arm without reflection equally into the two adjacent arms and transmitting no power into the opposite arm. Arms 104 and 103 or 102 and 101 are considered opposite arms and are so indicated on the block diagrams of Fig. 1 and Fig. 4.

With the principle of the magic tee in mind the consideration of the embodiment of Fig. 1 can be resumed. Wave guide sections 12 and 14 are of equivalent electrical length as are wave guide sections 21 and 25 so that a wave arriving at magic tee 24 from generator 10 via wave guide sections 14 and 25 will be in phase with a wave arriving via wave guide sections 12 and 21. Power from generator 10 divides equally between wave guide sections 12 and 14 at magic tee 15. Power in wave guide sections 12 and 14 divides equally between wave guide sections 19 and 21 and wave guide sections 25 and 27 at magic tees 17 and 18 respectively. Half of the power at magic tee 17 goes toward reference mismatch 23 and half toward magic tee 24. Half of the power at magic tee 18 goes toward reference mismatch 29 and half toward magic tee 24. Power in each of wave guide sections 21 and 25 arrives at magic tee 24 in phase where it continues to travel up wave guide section 30 but cancels in wave guide section 31. Any accidental power in wave guide section 31 is absorbed in matched load 32. The power in wave guide section 30 is attenuated by matched attenuator pad 33, transmitted to the unknown impedance 34, and reflected with a voltage reflection coefficient $\alpha$. This reflected power is attenuated by matched attenuator pad 33 and transmitted through the system of magic tees in such a manner that equal parts are injected into detectors 22 and 28 and absorbed by matched load 16 and generator 10. The power reflected from reference mismatch 23 with a reflection coefficient $\alpha_2$ is divided at magic tee 17 so that half is injected into detector 22 and half is absorbed by matched load 16 and generator 10. The power reflected from reference mismatch 29 with a reflection coefficient $\alpha_1$, is divided at magic tee 18 so that half is injected into detector 28 and half is absorbed by matched load 16 and generator 10. Therefore, for each detector there is an input equal to the vector sum of the voltage contributions from the unknown impedance 34 and the adjacent reference mismatch. Detectors 22 and 28 may take the form of diode crystal detectors now widely used at microwave frequencies.

In this embodiment reference mismatch 29 is made an infinite impedance so that $\alpha_1$ is $1 \angle 0°$ and reference mismatch 23 is made an inductive reactance of magnitude equal to the characteristic impedance of the wave guide system so that $\alpha_2$ is $1 \angle 90°$. The infinite impedance of mismatch 29 may be provided by merely open-circuiting the end of transmission line section 27. However, a quarter wave length section of wave guide, short-circuited at the end, provides a more accurate and stable termination. The reference mismatch 23 may also be a section of short-circuited transmission line less than a quarter wave length long, the actual length being selected to give the desired terminating impedance. While these terminating stubs may be continuations of wave guide sections 27 and 19, respectively, it is convenient for purposes of explanation to represent them as impedances terminating the ends of wave guide sections 27 and 19.

The length of wave guide section 27 is adjusted so that the output of detector 28 will be zero when the matched attenuator pad 33 is replaced by an infinite impedance. The length of wave guide section 19 is similarly adjusted so that the output of detector 22 will be zero when the matched attenuator pad 33 is replaced by an inductive reactance equal to that of reference mismatch 23.

A Smith Chart is a polar plot of the reflection coefficient of a transmission line. Superimposed on this plot are two orthogonal families of circular curves, one family of curves representing resistances and the other family representing reactances. Those familiar with this type of chart will recall that the chart is bounded by the circle of zero resistance and that a diameter of this circle represents the line of zero reactance. All of the circular resistance curves are tangent at one end of this diameter and all of the circular reactance curves have their centers on a straight line tangent to the circular resistance curves at their common point of tangency. A detailed description of the Smith Chart appeared in the January 1939 issue of "Electronics," published by McGraw-Hill Book Company, Inc. Additional description of this type of chart may be found in the January 1944 issue of "Electronics" and in volume 9 of the Radiation Laboratory Series by the same publisher.

Figure 3:
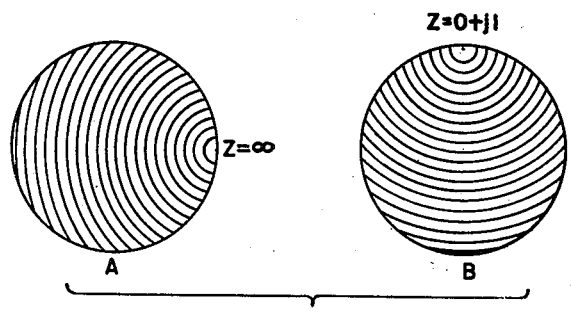
Fig. 3 is a pair of impedance charts of the Smith type with contours of constant power superimposed for specific reference impedances in the embodiment of Fig. 1.

It can be proven mathematically and it is evident from experimental procedure that if wave guide section 30 were terminated at matched attenuator pad 33 in impedances varying from zero through infinity, the loci of impedances that result in constant power from the detectors are circles concentric about $z=$ infinity and $z=0+jl$ for detectors 28 and 22 respectively on impedance charts of the Smith type. These loci of constant power are shown on the Smith Charts of Fig. 3. The resistance and reactance curves are not shown in Fig. 3, since they would tend to obscure the curves of constant power.

Detectors 22 and 28 may also include a sensitive voltmeter coupled to the crystal detector to indicate the amplitudes of the signals received thereby. From the known characteristics of the detectors and the other circuit constants which are known or can be measured, the positions of the power curves of Fig. 3 relative to the resistance and reactance curves of the Smith Chart may be mathematically calculated. Only one point for each curve need be calculated, since as stated previously these curves are circles having a common center. These calculated curves may be drawn on a chart including the resistance and reactance curves. A second and in some ways somewhat easier way of calibrating the power curves is to couple a series of known impedances to matched attenuator pad 33. Power circles are then drawn through the corresponding points on the Smith Chart and the readings of the two detectors recorded on the appropriate power circles. Additional power circles may then be calculated by interpolation of the measured data.

The method of employment of the bridge to measure an unknown impedance is believed to be obvious from the above description. The unknown impedance 34 is coupled to the bridge as shown in Fig. 1, the output power level of generator 10 is set to the lever used to calibrate the bridge and the output signals from detectors 22 and 28 are measured. These measured values are plotted on the calibrated Smith Chart and the resistance and reactance components of the unknown impedance 34 are read from the resistance and reactance curves of the Smith Chart.

For rapid measurement of an unknown impedance, a cathode ray tube indicator may be substituted for the voltmeters included in detectors 22 and 28. The outputs of detectors 28 and 22 may be coupled to the vertical and horizontal deflection circuits, respectively, of the cathode ray tube indicator. A transparent Smith Chart including only the resistance and reactance curves is superimposed on the screen of the indicator. Suitable bias currents are provided to displace the zero power indications to appropriate edge locations. Since the deflection circuits will move the cathode ray tube beam along straight lines rather than along circles corresponding to the circular power curves of Fig. 3, the resistance and reactance curves of the transparent Smith Chart placed over the indicator screen must be distorted to compensate for this fact. The distortion is negligible at the center of the screen because the contours of constant detector power are orthogonal in this region but at the edges the contours depart considerably from perpendicularity.

To avoid this distortion the attenuation of the matched attenuator pad 33 is made large so that the reflected wave from the unknown impedance 34 will be small compared with the reflected wave from the reference mismatches 23 and 29. The effect of this attenuation is to reduce the Smith Chart to a small area on the center of the cathode ray tube screen where the contours of constant power are approximately orthogonal and the distortion is therefore negligible. Amplifiers can of course be used to expand the undistorted pattern to cover the entire cathode ray tube screen. If it is kept in mind that the operation of the bridge is dependent upon the relative amplitudes of the incident and reflected waves in wave guide section 30, that the incident and reflected waves in wave guide section 30 determine the standing wave ratio in wave guide section 30, and that on a Smith Chart the smaller standing wave ratios are located near the center of the chart, the effect of matched attenuator pad 33 can be visualized.

The method of operating the bridge with the cathode ray tube indicator is very similar to the operation of the circuit with voltmeters coupled to detectors 22 and 28. The bridge is first calibrated by mathematical computation or by measurements on known impedances, and then the unknown impedance is coupled to the bridge as shown at 34 in Fig. 1. The outputs of detectors 22 and 28, acting through the deflection circuits of the indicator, move the cathode ray beam to its proper position on the screen of the indicator. The position of the cathode ray beam is indicated by a spot of light on the screen in the conventional manner. The resistance and reactance components of the unknown impedance are then found by determining the resistance and reactance curves on the overlying chart that pass through this spot of light.

Figure 4:
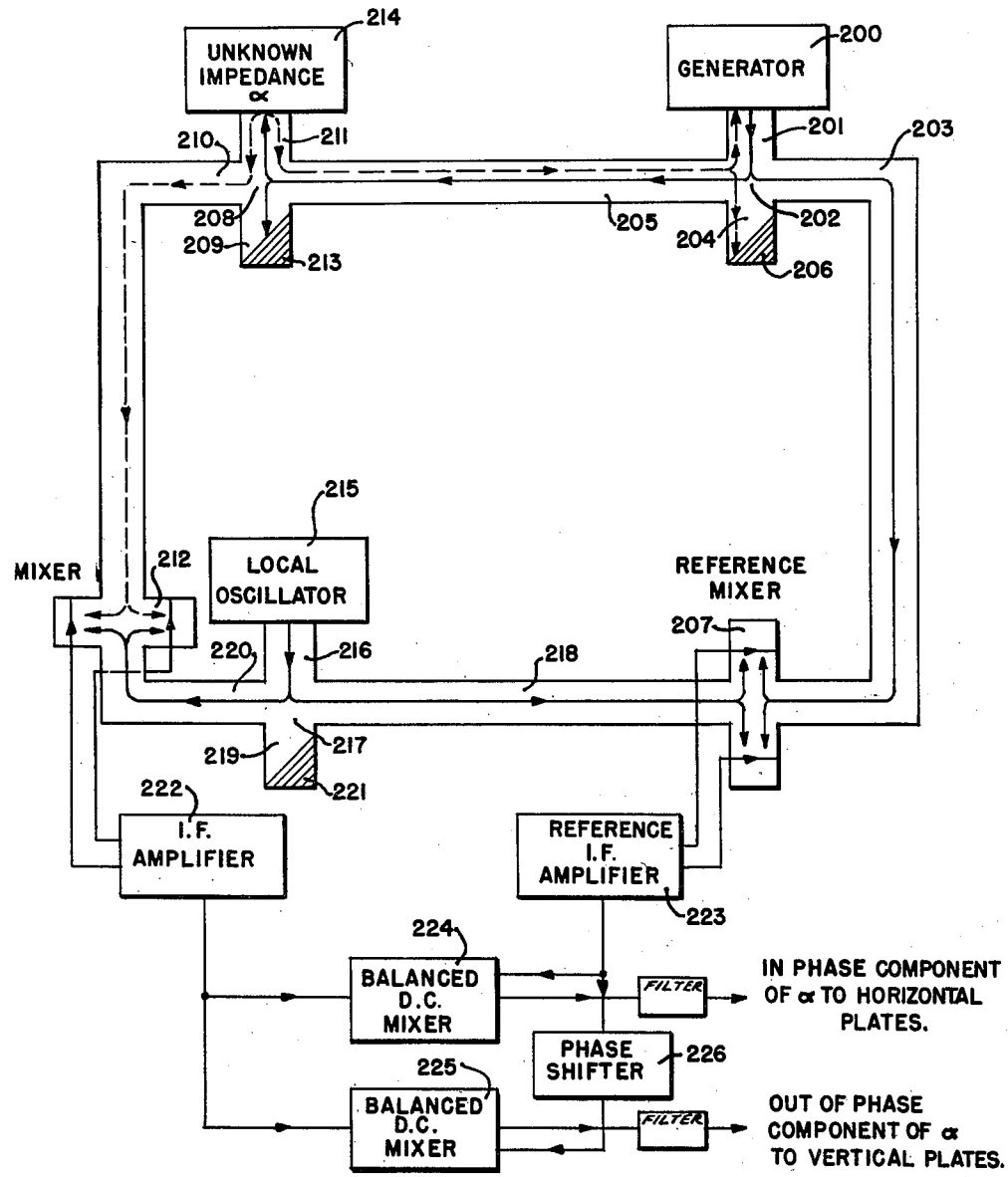
Fig. 4 is a block diagram of one embodiment of a second species of the invention.

A second species of the invention is disclosed in Fig. 4. Generator 200 injects power into wave guide section 201 which in turn is terminated in magic tee 202. Magic tee 202 comprises the junction of wave guide sections 201, 203, 204, and 205. Wave guide section 204 located opposite wave guide section 201 is terminated in matched load 206. Wave guide section 203 located adjacent to wave guide section 201 is terminated in reference mixer 207. Wave guide section 205 located opposite wave guide section 203 is terminated in magic tee 208. Magic tee 208 comprises the junction of wave guide sections 205, 209, 210, and 211. Wave guide section 210 located opposite wave guide section 205 is terminated in mixer 212. Wave guide section 209 located adjacent to wave guide section 205 is terminated in matched load 213. Wave guide section 211 located opposite wave guide section 209 is terminated in the unknown impedance 214 having a voltage reflection coefficient $\alpha$. Local oscillator 215 injects power into wave guide section 216 which in turn is terminated in magic tee 217. Magic tee 217 comprises the junction of wave guide sections 216, 218, 219, and 220. Wave guide sections 218 and 220 located opposite to one another and adjacent to wave guide section 216 are terminated in reference mixer 207 and mixer 212 respectively. Wave guide section 219 is terminated in matched load 221. The beat frequencies produced by mixer 212 and reference mixer 207 are amplified by intermediate frequency amplifier 222 and reference intermediate frequency amplifier 223 respectively and fed into balance D. C. mixer 224. These amplified beat frequencies are fed into balanced D. C. mixer 225 in the same manner except that the phase of the beat frequency from reference intermediate frequency amplifier 223 is shifted through precisely 90 degrees by phase shifter 226.

Power from generator 200 is divided at magic tee 202 so that half goes to reference mixer 207 and half goes to magic tee 208. The circuit associated with magic tee 208 forms an accurate impedance bridge. It is apparent that the power from the generator is divided so that half is absorbed by matched load 213 and half is transmitted in wave guide section 211 toward unknown impedance 214 to be reflected thereby. The reflected wave is again divided at magic tee 208 and equal waves are transmitted in each of wave guide sections 210 and 205. Therefore the output of the impedance bridge obtained in wave guide section 210 when compared with the input to the impedance bridge injected in wave guide section 205 represents the complex reflection coefficient $\alpha$ in amplitude and phase. The output wave is fed into mixer 212. Local oscillator 215 feeds equal amounts of power to both mixer 212 and reference mixer 207. Mixers 207 and 212 are shown as magic tee balanced mixers, but other types of balanced mixers or single crystal mixers may be substituted without altering the operation of the bridge.

Wave guide sections 220 and 218 are of equivalent electrical length so that the equal amounts of power from local oscillator 215 transmitted through these wave guide sections arrive at mixer 212 and reference mixer 207 in phase. The electrical lengths of the remaining sections of the wave guide system are adjusted so that the path length from the generator 200 to reference mixer 207 is equal to that from generator 200 to the unknown impedance 214 plus that from unknown impedance 214 to mixer 212. Therefore a comparison of the output from the intermediate frequency amplifiers 222 and 223 is the equivalent in amplitude and phase of a comparison of the waves reflected from and incident upon unknown impedance 214. Balanced mixer 224 provides a direct current output proportional to the in-phase components of the reflection coefficient $\alpha$. This is accomplished by means of a suitable filter in the output of the mixer and by injecting the input from the intermediate frequency amplifier in push-pull and that from the reference intermediate frequency amplifier in push-push. Thus when the inputs are 90 degrees out of-phase the components of the output will cancel but depending upon whether the inputs are closer to in-phase or 180 degrees out-of-phase the output will be positive or negative. Balanced D. C. mixer 225 operates in the same manner but its direct current output is proportional to the quadrature component of the reflection coefficient $\alpha$ by reason of the 90 degree phase shift introduced into one of the inputs by phase shifter 226. Balanced D. C. mixers of the type referred to are also known to those skilled in the art as "lock-in-amplifiers."

If the outputs of the two balanced D. C. mixers 224 and 225 are applied to the appropriate deflecting plates of a cathode ray tube the presentation will represent a polar plot of the complex reflection coefficient. A plot of this kind is the familiar Smith Chart for complex impedances. It will be obvious that the outputs of balanced D. C. mixers 224 and 223 may also be applied to suitable D. C. meters, and the data read from these meters manually transferred to a Smith Chart.

This invention is not to be limited by the foregoing description but only by the appended claims.

What is claimed is:

1. Apparatus for impedance measurement at microwave frequencies comprising, a generator capable of generating continuous oscillations at said microwave frequencies, a first transmission means for directing waves from said generator, a first magic tee of the type described terminating said first transmission means, a second transmission means connected to said first magic tee opposite said first transmission means, a first matched load terminating said second transmission means, third and fourth transmission means connected to said first magic tee opposite to one another and adjacent to said first transmission means, second and third magic tees terminating said third and fourth transmission means respectively, a fifth and sixth transmission means connected respectively to said second and third magic tees adjacent to said third and fourth transmission means, a fourth magic tee, said fifth and sixth transmission means being terminated in opposite sides of said fourth magic tee, a seventh and eighth transmission means connected to opposite sides of said fourth magic tee, a second matched load terminating said seventh transmission means, said impedance to be measured terminating said eighth transmission means, a ninth and tenth transmission means connected respectively to said second and third magic tees opposite to said fifth and sixth transmission means, first and second reference mismatches terminating said ninth and tenth transmission means, the impedances of said first and second reference mismatches being so adjusted as to provide complex reflection coefficients of unity amplitude with angles differing by 90 degrees, eleventh and twelfth transmission means connected respectively to said second and third magic tees opposite to said third and fourth transmission means, a first and second detector terminating respectively said eleventh and twelfth transmission means and matched thereto, the electrical length of said third and fourth transmission means being equal, the electrical length of said fifth and sixth transmission means being equal, the electrical lengths of said ninth and tenth transmission means being adjusted for zero output from said first and second detectors when said impedance to be measured is replaced by impedances equivalent to said first and second reference mismatches respectively, a cathode ray tube, the output of said first and second detectors being connected to orthogonal deflecting means associated with said cathode ray tube to provide an approximate polar plot of the complex reflection coefficient of said impedance to be measured.

2. The structure of claim 1 with matched attenuator pads inserted in the transmission means between said unknown impedance to be measured and said second and third magic tees to reduce the distortion of said polar plot of said complex reflection coefficient.

3. Apparatus for impedance measurement at microwave frequencies comprising, a generator capable of generating continuous oscillation at said microwave frequencies, a first transmission means for directing waves from said generator, a first magic tee of the type described terminating said first transmission means, a second transmission means connected to said first magic tee opposite to said first transmission means a first matched load terminating said second transmission means, third and fourth transmission means connected to said first magic tee opposite to one another, a reference mixer terminating said third transmission means and matched thereto, an impedance bridge terminating said fourth transmission means and matched thereto, said impedance bridge including said impedance to be measured, the output from said impedance bridge being proportional in magnitude and phase to the reflected wave from said impedance to be measured with respect to the wave incident thereupon, a mixer, a fifth transmission means for connecting the output of said impedance bridge to said mixer, the electrical length of said fourth and fifth transmission means being substantially equal to said third transmission means so that the magnitude and phase of the waves reaching said mixer and said reference mixer are related as the magnitude and phase of the waves reflected from and incident upon said impedance to be measured, a local oscillator, a sixth transmission means for directing the power from said local oscillator to said mixer and said reference mixer, said sixth transmission means so adjusted that the power from said local oscillator arrives at said mixer and said reference mixer in phase, an intermediate frequency amplifier to amplify the output from said mixer, a reference intermediate frequency amplifier for amplifying the output from said reference mixer, comparison means for comparing the outputs of said intermediate frequency amplifier and said reference intermediate frequency amplifier and providing outputs proportional to the in-phase and quadrature component of the former with respect to the latter, a cathode ray tube, the outputs of said comparison means connected to orthogonal deflecting means associated with said cathode ray tube to provide a polar plot of the complex reflection coefficient of said impedance to be measured.

4. Apparatus for impedance measurement at microwave frequencies comprising, a generator capable of generating continuous oscillations at said microwave frequencies, a first transmission means for directing waves from said generator, a first magic tee of the type described, terminating said first transmission means, a second transmission means connected to said first magic tee opposite to said first transmission means, a first matched load terminating said second transmission means, third and fourth transmission means connected to said first magic tee opposite to one another, a reference mixer terminating said third transmission means and matched thereto, a second magic tee terminating said fourth transmission means, a fifth and sixth transmission means connected to said second magic tee opposite to one another, a second matched load terminating said fifth transmission means, said impedance to be measured terminating said sixth transmission means, a seventh transmission means connected to said second magic tee opposite to said fourth transmission means, a mixer terminating said seventh transmission means and matched thereto, a local oscillator, an eighth transmission means for directing power from said local oscillator, a third magic tee, a ninth transmission means connected to said third magic tee opposite to said eighth transmission means, a third matched load terminating said ninth transmission means, tenth and eleventh transmission means connected to said third magic tee opposite to one another, said tenth and eleventh transmission means being terminated in said mixer and said reference mixer respectively and matched thereto, the electrical length of the transmission means between said generator and said reference mixer being equal to the sum of the lengths between said generator and said impedance to be measured and between said impedance to be measured and said mixer, the electrical lengths of the transmission means between said local oscillator and said mixer and said reference mixer being equal, an intermediate frequency amplifier connected to amplify the output of said mixer, a reference intermediate frequency amplifier connected to amplify the output of said reference mixer, a first balanced D. C. mixer connected to receive inputs from said intermediate frequency amplifier and said reference intermediate frequency amplifier, the output of said first balanced D. C. mixer being filtered to provide a voltage proportional to the in-phase component of the input from said intermediate frequency amplifier with respect to that from said reference intermediate frequency amplifier, a phase shifter to shift the phase of the output from said reference intermediate frequency amplifier by 90 degrees, a second balanced D. C. mixer connected to receive an input from said intermediate frequency amplifier and an input shifted in phase by 90 degrees from said reference intermediate frequency amplifier, the output of said second balanced D. C. mixer being filtered to provide a voltage proportional to the quadrature component of the output from said intermediate frequency amplifier with respect to that from said reference intermediate frequency amplifier, a cathode ray tube, the outputs from said first and second balanced D. C. mixers being connected to orthogonal deflecting means associated with said cathode ray tube to provide a polar plot of the complex reflection coefficient of said impedance to be measured.

5. In combination, a generator capable of generating continuous oscillations at microwave frequencies, a local oscillator, a first and a second mixer, first and second microwave transmission means coupling said local oscillator to said first and second mixers, respectively, the electrical lengths of said first and second transmission means being such that the signal from said local oscillator is supplied to said first and second mixers in phase, third and fourth transmission means coupling said generator to said first and second mixers, respectively, said third and fourth transmission means differing in electrical length by an integral number of wavelengths measured at the frequency of said generator, said integral number including zero, means for coupling an unknown impedance to be measured between first and second sections of said third transmission means, the signal from said first section reaching said second section of said third transmission means after reflection from said unknown impedance, and comparison means coupled to said first and second mixers, said comparison means generating a first signal proportional in amplitude to the components of the signals from said first and second mixers which are in phase with each other and a second signal proportional in amplitude to the components of the signals from said first and second mixers which are in phase quadrature with each other.

6. Apparatus for impedance measurement at microwave frequencies comprising, a generator capable of generating continuous oscillations at said microwave frequencies, a local oscillator, a first and a second mixer, first and second microwave transmission means coupling said local oscillator to said first and second mixers, respectively, the electrical lengths of said first and second transmission means being such that the signal from said local oscillator is supplied to said first and second mixers in phase, third and fourth transmission means coupling said generator to said first and second mixers, respectively, said third and fourth transmission means differing in electrical length by an integral number of wave lengths measured at the frequency of said generator, said integral number including zero, means for coupling an unknown impedance to be measured between first and second sections of said third transmission means, said means including a section of microwave transmission line terminated by said unknown impedance, said means coupling a signal from said first section of said third transmission means to said transmission line as an incident wave and coupling the signal in said transmission line after reflection from said unknown impedance to said second section of said third transmission means, first and second balanced D. C. mixers, means coupling the output of said first mixer to said first and second balanced D. C. mixers in equal amplitude and in phase, means coupling the output of said second mixer to said first and second balanced D. C. mixers in equal amplitude and in phase quadrature, and indicator means coupled to said first and second balanced D. C. mixers to indicate the amplitudes of the signals generated thereby.

7. Apparatus for impedance measurement at microwave frequencies comprising, a generator capable of generating continuous oscillations at said microwave frequencies, a local oscillator, a first and a second mixer, first and second microwave transmission means coupling said local oscillator to said first and second mixers, respectively, the electrical lengths of said first and second transmission means being such that the signal from said local oscillator is supplied to said first and second mixers in phase, third and fourth transmission means coupling said generator to said first and second mixers, respectively, said third transmission means comprising, first and second wave guides, a magic tee, said first and second wave guides being coupled to first and second opposite arms of said magic tee, a matched load terminating a third arm of said magic tee, means coupling an unknown impedance to a fourth arm of said magic tee, the electrical length of said third transmission means measured from said generator to said unknown impedance and then to said first mixer differing from the electrical length of said fourth transmission means by an integral number of wave lengths measured at the frequency of said generator, said integral number including zero, first and second balanced D. C. mixers, means coupling the output of said first mixer to said first and second balanced D. C. mixers in the same phase, and means coupling the output of said second mixer to said first and second balanced D. C. mixers in phase quadrature, said first balanced D. C. mixer providing an output having an amplitude indicative of the amplitude of the in-phase component of the reflection coefficient of said unknown impedance, said second balanced D. C. mixer providing an output signal having an amplitude indicative of the amplitude of the out-of-phase component of the reflection coefficient of said unknown impedance, and indicator means coupled to said first and second balanced D. C. mixers for measuring the amplitudes of the output thereof.

8. Apparatus as in claim 7 wherein said indicator means, coupled to said first and second balanced D. C. mixers, comprises a cathode ray tube indicator having first and second deflection circuits adapted to deflect the electron beam of said indicator parallel to perpendicularly disposed axes, said first and second deflection circuits being coupled to the outputs of said first and second balanced D. C. mixers, respectively.

References Cited in the file of this patent
UNITED STATES PATENTS

| | | |
|---|---|---|
| 2,416,790 | Barrow | Mar. 4, 1947 |
| 2,522,563 | Blitz | Sept. 19, 1950 |